United States Patent [19]

Sakakibara

[11] 3,917,133

[45] Nov. 4, 1975

[54] GAS SEALING DEVICE FOR INTERNAL COMBUSTION ENGINE PISTONS

[76] Inventor: Shigekado Sakakibara, 3-8-1 Nakakaigan, Chigasaki, Kanagawa, Japan

[22] Filed: Mar. 18, 1974

[21] Appl. No.: 452,378

[30] Foreign Application Priority Data
Mar. 20, 1973 Japan.................. 48-32004

[52] U.S. Cl................ 123/193 P; 277/123; 277/197
[51] Int. Cl.²........................................ F02F 5/00
[58] Field of Search..... 123/193 P, 193 CP; 92/172, 92/192, 194; 277/123, 197

[56] References Cited
UNITED STATES PATENTS

| | | | |
|---|---|---|---|
| 1,238,191 | 8/1917 | Redin.................. | 277/197 |
| 1,446,076 | 2/1923 | Waterman............ | 277/197 |
| 1,477,120 | 12/1923 | Hanson................ | 29/156.6 |
| 2,021,572 | 11/1935 | Wuerfel................ | 29/156.6 R |
| 2,619,392 | 11/1952 | Brown.................. | 277/123 X |
| 3,455,565 | 7/1969 | Jepsen.................. | 277/197 X |
| R15,610 | 5/1923 | Bramberry............ | 277/197 X |

*Primary Examiner*—Charles J. Myhre
*Assistant Examiner*—William C. Anderson
*Attorney, Agent, or Firm*—Waters, Schwartz & Nissen

[57] ABSTRACT

A gas sealing device specially designed to prevent gases from blowing down through the clearance between the piston and the cylinder wall and including at least two thin piston rings arranged one over the other in a common annular groove formed in the piston with their gaps shifted angularly from each other. It minimizes ingress of lubricant oil into the working space of the cylinder as well as gas leakage through the clearance.

2 Claims, 3 Drawing Figures

GAS SEALING DEVICE FOR INTERNAL COMBUSTION ENGINE PISTONS

BACKGROUND OF THE INVENTION

This invention relates to gas sealing devices for internal combustion engines and more particularly for those used on each piston of an internal combustion engine to prevent gases from blowing down past the piston to the crank case side of the cylinder.

As is well known, there are normally mounted on the upper portion of a piston a plurality of rings of which the top two, usually called compression rings, are principally intended to serve the purpose of preventing gases from blowing down past the piston. Generally, however, piston rings are each formed with a gap therein so that it may be slipped on the piston and that an appopriate pressure against the cylinder wall may be obtained under the resiliency of the ring when it is compressed into the engine cylinder. Such gap in the piston ring unavoidably allows some leakage of gases therethrough. In addition, as the thickness of the piston ring is reduced in order to reduce the friction between the ring and the cylinder wall, the flow-throttling effect of the gap in the ring is also naturally reduced, disadvantageously increasing the tendency of gases to leak.

SUMMARY OF THE INVENTION

In view of the above, the present invention is principally intended to minimize the amount of gases blowing down to the crankcase side of the cylinder through the clearance between the piston and the cylinder wall and has for its object the provision of a novel gas sealing device which is highly effective to throttle the gas leakage flow through the clearance without increasing the friction between the piston and the cylinder wall to any substantial extent.

According to the present invention, the gas sealing device includes at least two relatively thin piston rings fitted in a common annular groove formed about the periphery of the associated engine piston with their gaps shifted angularly from each other.

The above and other objects, features and advantages of the present invention will become apparent from the following description when taken in conjunction with the accompanying drawing, which illustrates one preferred embodiment of the invention.

DESCRIPTION OF THE PREFERRED EMBODIMENT

Figure 3:
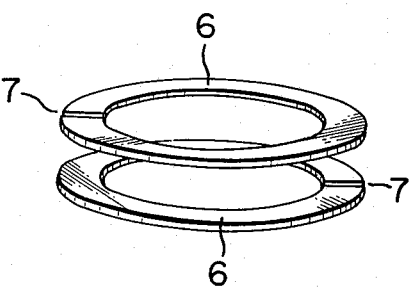
FIG. 3 is a perspective view showing the pair of auxiliary piston rings, which forms the essential part of the device.

Referring to the drawing, reference character P generally designates an engine piston fitted with the gas sealing device of the invention and formed in the upper land portion 1 above the piston-pin receiving holes 2 with a set of four annular ring receiving grooves $3_1$, $3_2$, $3_3$ and $3_4$. Fitted in these grooves except the third from the top are a first and a second compression ring $4_1$ and $4_2$ an oil scraper ring 5 respectively, with a pair of auxiliary rings 6 of thin steel sheet fitted in the third groove $3_3$ in overlying relation with each other. The auxiliary rings 6 are each formed with a gap 7, as shown in FIG. 3, and are resiliently yieldable for radial expansion and contraction, like the other conventional rings. Also, the auxiliary rings 6 have an extremely limited thickness for their width and are hard-chrome plated over the surface thereof in a thickness of from 0.02 mm. to 0.03 mm. The gaps 7 in the respective auxiliary rings 6 as fitted in the third annular groove $3_3$ are shifted angularly from each other and preferably to an angular distance of approximately 180°, as shown in FIG. 3. Reference numeral S in Figure designates the wall of the cylinder barrel in which the piston P is fitted.

Description will next be made of the operation of the gas sealing device described above.

As is well known, during the compression, expansion and exhaust strokes of the engine, the gas pressure in the working chamber of the engine cylinder acts first upon top surface of the first compression ring $4_1$ to press it against the bottom side wall of the first annular groove $3_1$ for gas-sealing engagement therewith while allowing part of the gases to leak through the gap, not shown, in the ring $4_1$ to the underside thereof. Part of such leak gases flows further through the gap formed in the second compression ring $4_2$ to the underside thereof to exert its pressure upon the top surface of the upper auxiliary ring 6. In this manner, the pair of two auxiliary rings 6 is pressed against the bottom side wall of the third annular groove $3_3$ in a state tightly held against each other. Under this condition, gas leakage to the underside of the pair of auxiliary rings 6 is allowed only through the gap 7 formed in the lower auxiliary ring 6. This ring gap 7, however, is enclosed at the top and bottom, respectively, by the bottom surface of the upper auxiliary ring 6 and the bottom side wall of the third annular groove $3_3$. This fact together with the fact that the auxiliary ring 6 has a thickness very limited relative to its width makes the local gas passageway very narrow and long, affording a correspondingly large throttling effect upon the flow of leak gases, and in this manner materially reduces the amount of gas leakage toward the bottom, fourth annular groove $3_4$.

During the suction stroke of the engine, the oil scraper ring 5 serves to scrape down the excess lubricant oil adhering to the inner surface of the cylinder wall S and part of such oil left unscraped on the cylinder surface is scraped down by the pair of auxiliary rings 6 in an effective manner since the pair of two auxiliary rings 6 is held pressed this time against the top side wall of the third annular groove $3_3$ with the two rings tightly held against each other in the same manner as described above. In other works, any excess oil remaining on the cylinder wall S is positively scraped down by the pair of auxiliary piston rings 6, which defines a very limited oil passageway at the gap 7 in the upper auxiliary ring 6.

The following table shows the results of tests conducted on an automobile engine A provided with the device of the present invention and an ordinary automobile engine B to compare the amounts of gas leakage in the respective engines. As seen in the table, the amount of gas leakage in the engine A, provided with the device of the present invention, was about half that in engine B, demonstrating the excellent performance of the device of the present invention. The engines tested were both of the two cylinder type, having a displacement of approximately 800 c.c., and, in the device of the present invention, a pair of two auxiliary piston rings were employed, each having a thickness of 0.6 mm. and a width of 3.0 mm.

| Engine speed, RPM (Car speed, km/hr) | | Gas leakage, cc.min | |
|---|---|---|---|
| | | Engine A | Engine B |
| 700 | (0) | 2200 | 4000 |
| 1000 | (30) | 2200 | 3500 |
| 2000 | (60) | 2500 | 4270 |
| 3000 | (90) | 2500 | 4270 |

As for the vacuum in the engine intake, the value measured on the engine A was approximately 30 mmHg lower than that of the engine B, both measured at 800 RPM. This demonstrates the advantageous effect of the device of the present invention upon the engine suction. Also, with the engine A, it was found that lubricant oil used therein does not exhibit any noticeable tendency to be emulsified under the effect of gas leakage and this also demonstrates that the device of present invention is highly effective to reduce gas leakage in the engine.

To summarize, the device of the present invention, with its simple construction including at least two thin piston rings, i.e., auxiliary rings 6, fitted in a common annular groove formed about the associated piston in a state lying one over the other, is capable of materially reducing the amount of gases blowing down past the piston to the crankcase side thereof while at the same time substantially reducing ingress of lubricant oil into the working space in the cylinder. This means that use of the device of the invention minimizes pollution of atmospheric air due to the gas leakage while preventing any disorder in engine operation as resulting from combustion of lubricant oil. In addition, the piston rings of the device are so limited in thickness that the friction between the cylinder wall and these rings is very limited, enabling use of such device without causing any substantial reduction in power output of the engine.

Figure 1:
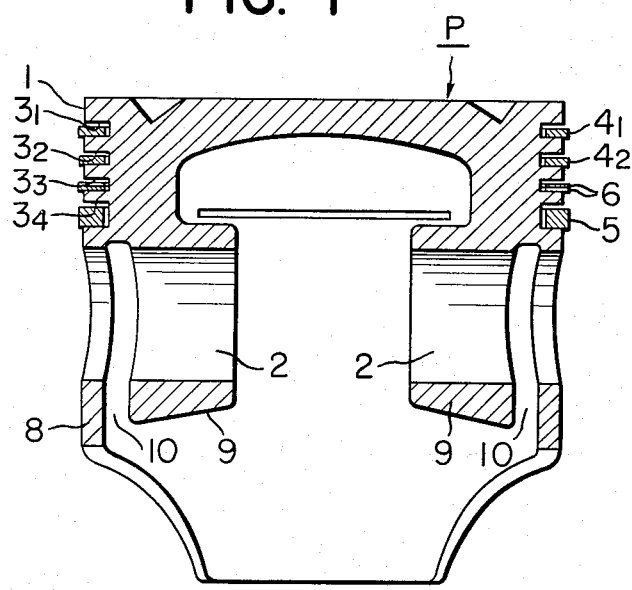
FIG. 1 is an axial cross-sectional view of an engine piston embodying the present invention.
Figure 2:
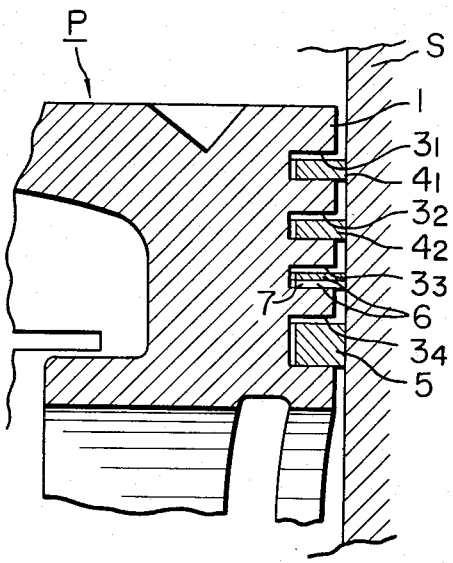
FIG. 2 is a fragmentary view similar to FIG. 1, showing the state in which the piston of FIG. 1 is fitted in the associated engine cylinder.

Incidentally, it is desirable to form a pair of notches in the engine piston on the opposite sides thereof, as indicated at 10 in FIG. 1, in order to separate the skirt portion 8 of the piston from the radially inwardly projecting bases 9 in which holes 2 are formed in alignment with each other to jointly receive a piston pin, not shown. The notch formation apparently enables the piston skirt portion 8, when heated, to expand uniformly around the periphery thereof and thus makes it possible prelimarily turn the piston to a truly circular cross-sectional shape in the stage of its fabrication. Accordingly, the side clearance between the piston P and cylinder S can be kept circumferentially uniform irrespective of the engine temperature and thus any jolting of the piston resulting from a nonuniform side clearance and gas leakage occurring therewith can be effectively prevented.

While one preferred embodiment of the present invention has been shown and described, it will be apparent to those skilled in the art that many changes and modifications can be made without departing from the spirit of the invention or from the scope of the appended claim.

What is claimed is:

1. In an internal combustion engine having at least one reciprocable piston with a plurality of annular grooves therein and compression and oil rings positioned within respective upper and lower ones of said grooves, the combination of at least one additional annular groove intermediate said upper and lower grooves, at least two auxiliary split rings mounted in overlying relation within each of said additional grooves, each of said split rings being circumferentially extending and having a radially extending gap between the free ends thereof, the split rings in each said additional groove being positioned such that their radial gaps are circumferentially displaced relative to each other and out of axial alignment, each of said auxiliary split rings being extremely thin relative to the thickness of said compression rings and the combined thickness of the auxiliary split rings within any of said additional grooves being less than the thickness of any one of said compression rings.

2. The combination of claim 1, wherein said piston includes a peripheral skirt portion which depends from the head of said piston and a pair of depending bosses, said bosses being spaced inwardly of said skirt by notches formed between said skirt and bosses, said skirt and bosses being provided with through apertures in alignment adapted to thereby receive a piston pin.

* * * * *